March 20, 1928.

A. Y. DODGE

BRAKE

Filed July 16, 1927

1,663,295

INVENTOR
ADIEL Y. DODGE
BY
ATTORNEY

Patented Mar. 20, 1928.

1,663,295

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed July 16, 1927. Serial No. 206,184.

This invention relates to brakes and is illustrated as embodied in an internal expanding brake for an automobile. An object of the invention is to balance the return springs acting on the shoes or equivalent friction parts by the provision of novel means which can readily be adjusted without the use of any measuring instruments or the like. Preferably the springs are connected to an angularly movable arm which shifts itself to balance the pressure of the springs when the brake is applied and which is then clamped firmly in adjusted position to prevent further shifting.

Figure 1:
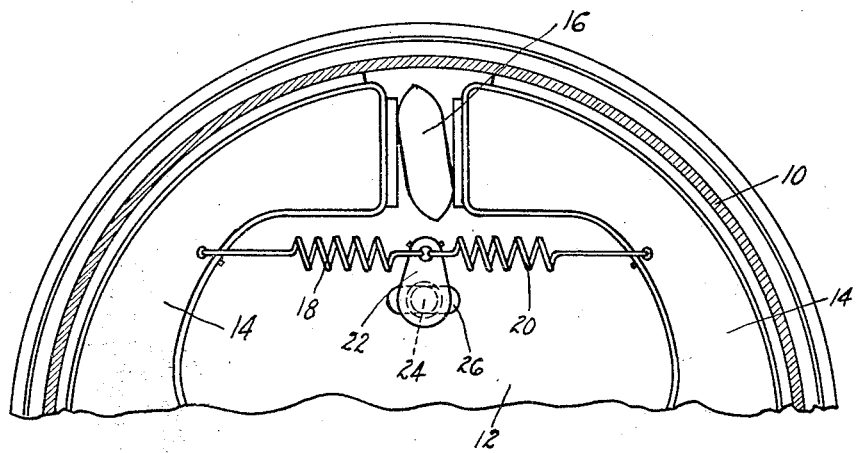
Figure 2:
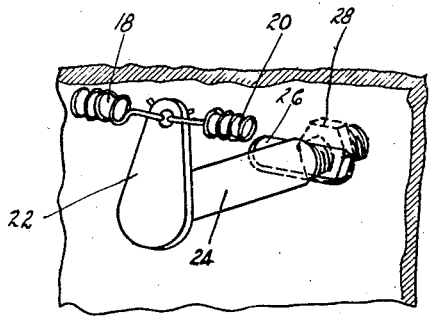

The above and other objects and features of the invention, including various novel and desirable details of construction, will be apparent from the following description of one illustrative embodiment shown in the accompanying drawing, in which:

Figure 1 is a partial vertical section through the upper part of the brake just inside the head of the brake drum and showing the brake shoes in side elevation; and Figure 2 is a perspective of the above-described movable arm and its mounting.

In the arrangement selected for illustration the brake includes a rotatable drum 10, at the open side of which is arranged a backing plate 12 and within which is arranged the friction means of the brake. The friction means is illustrated as including brake shoes 14 forced against the drum by means such as a double cam 16 against the resistance of return springs 18 and 20.

The present invention relates to the balancing of springs 18 and 20 so that they will act on the shoes 14 or their equivalents with equal force. Preferably the springs are connected to an angularly movable arm 22 having a bolt or stem 24 projecting through a slot 26 in the backing plate. When the brake is applied, as for example by turning the cam 16, the springs 18 and 20 will turn the arm 22 until the pressures are balanced, and while the brake is held so applied a nut 28 is tightened up on the bolt or stem 24 to secure it firmly in place in its adjusted position, thus preserving the balancing of the springs 18 and 20.

While one illustrative embodiment has been described in detail, it is not my intention to limit the scope of the invention to that particular embodiment or otherwise than by the terms of the appended claims.

I claim:

1. A brake comprising oppositely-movable friction parts, in combination with a spring resisting movement of each of said parts, an angularly movable arm to which said springs are connected and which is shifted to balance the springs by application of the brake, and means for securing said arm with the springs balanced, to prevent it from shifting further.

2. A brake comprising oppositely-movable friction parts, in combination with a spring resisting movement of each of said parts, an angularly movable arm to which said springs are connected and which is shifted to balance the springs by application of the brake, and a clamping bolt and nut adapted to be tightened to prevent further shifting of the arm.

In testimony whereof, I have hereunto signed my name.

ADIEL Y. DODGE.